United States Patent
Ghanes et al.

(10) Patent No.: US 12,231,064 B2
(45) Date of Patent: Feb. 18, 2025

(54) METHOD FOR ESTIMATING THE ELECTROMAGNETIC TORQUE OF A SYNCHRONOUS ELECTRIC MACHINE

(71) Applicant: RENAULT S.A.S, Boulogne-Billancourt (FR)

(72) Inventors: Malek Ghanes, Nantes (FR); Mohamed Hamida, Nantes (FR); Abdelmalek Maloum, Chevilly Larue (FR); Mehdi Taherzadeh, Nantes (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 68 days.

(21) Appl. No.: 17/760,084

(22) PCT Filed: Feb. 1, 2021

(86) PCT No.: PCT/EP2021/052300
§ 371 (c)(1),
(2) Date: Aug. 3, 2022

(87) PCT Pub. No.: WO2021/156202
PCT Pub. Date: Aug. 12, 2021

(65) Prior Publication Data
US 2023/0041799 A1 Feb. 9, 2023

(30) Foreign Application Priority Data
Feb. 4, 2020 (FR) ........................ 2001076

(51) Int. Cl.
*H02P 6/10* (2006.01)
*H02P 6/18* (2016.01)
(Continued)

(52) U.S. Cl.
CPC ............ *H02P 21/12* (2013.01); *H02P 21/141* (2013.01); *H02P 21/20* (2016.02)

(58) Field of Classification Search
CPC ..................................... H02P 9/02; H02P 9/40
See application file for complete search history.

(56) References Cited

U.S. PATENT DOCUMENTS 5,003,243 A * 3/1991 Tadakuma ............ H02P 21/09
318/808
10,218,301 B1 * 2/2019 Wang .................. H02P 21/18
(Continued)

FOREIGN PATENT DOCUMENTS

FR 3 075 515 A1 6/2019

OTHER PUBLICATIONS

International Search Report issued Mar. 24, 2021 in PCT/EP2021/052300 filed Feb. 1, 2021, 2 pages.
(Continued)

*Primary Examiner* — Kawing Chan
*Assistant Examiner* — Charles S Laughlin
(74) *Attorney, Agent, or Firm* — Oblon, McClelland, Maier & Neustadt, L.L.P.

(57) ABSTRACT

A device estimates the electromagnetic torque of a three-phase synchronous electric machine including permanent magnets. The device includes: a first flux estimator including two integrators of electromotive force for estimating the respective components of the flux in a fixed two-phase coordinate system tied to the stator, an estimator for estimating the torque from the respective estimated-flux components, a second flux estimator that uses currents expressed in a rotating two-phase coordinate system tied to the rotor, with an observer for determining variables that characterize magnetic uncertainties of the machine with a view to correcting the flux estimation of the second estimator, and a detector for generating a signal for resetting initial flux conditions of the two integrators based on the flux estimation delivered by the second estimator, when the discrepancy between the estimated torque and a setpoint torque is higher than a predefined threshold.

8 Claims, 1 Drawing Sheet

(51) Int. Cl.
*H02P 21/12* (2016.01)
*H02P 21/14* (2016.01)
*H02P 21/20* (2016.01)

(56) References Cited

U.S. PATENT DOCUMENTS

| | | |
|---|---|---|
| 11,038,452 B2* | 6/2021 | Lin .................. H02P 21/22 |
| 2014/0203754 A1* | 7/2014 | Bhangu ............ H02P 21/12 |
| | | 318/702 |

OTHER PUBLICATIONS

French Preliminary Search Report issued Jan. 19, 2021 in French Patent Application No. 2001076 (with English translation of Category of Cited Documents), 3 pages.
Chen Wei, et al., "Improvement of Stator Flux Observer for a Direct Torque Controlled PMSM Drive at Low Speed," 2012 IEEE 7th International Power Electronics and Motion Control Conference, Jun. 2012, pp. 2462-2466.
Yueming Zhang, et al., "Sensorless Control of Permanent Magnet Synchronous Motor with Optimized Performance at Low Speed," 2019 22nd International Conference on Electrical Machines and Systems (ICEMS), 2019, 5 pages.

* cited by examiner

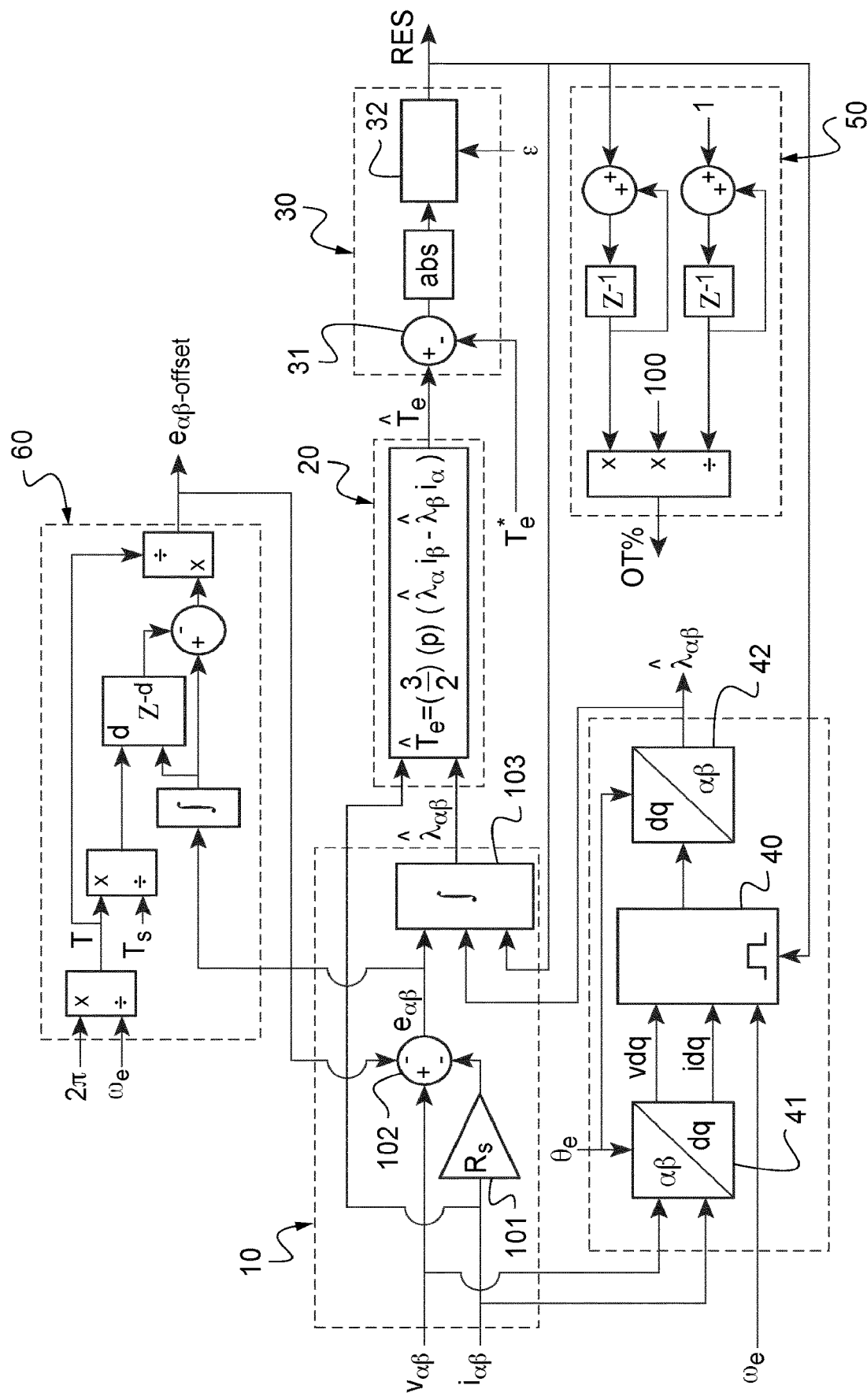

METHOD FOR ESTIMATING THE ELECTROMAGNETIC TORQUE OF A SYNCHRONOUS ELECTRIC MACHINE

The invention relates to a method for estimating the electromagnetic torque of a three-phase synchronous electric machine and, in particular, of a permanent-magnet three-phase synchronous electric machine (PMSM).

The invention is advantageously applied in the field of hybrid-electric and electric motor vehicles, in which this type of machine is widely used as a traction motor, in electric traction mode of the vehicle, in particular due to its robustness, its simplicity and its low maintenance cost.

In a motor vehicle with electric traction, it is necessary to know the real value of the motor torque supplied by the electric machine, in particular for safety and/or control reasons. In general, the mechanical drive torque of the machine is obtained from a torque meter, which measures the torque on the shaft. For many reasons such as cost, reliability and bulk, it is however preferable to eliminate the torque meter from the drive system and to replace it with a torque estimator.

A torque estimator is designed to estimate the real value of the torque supplied by the electric machine using certain available variables, such as voltages, currents and the position of the rotor.

Conventionally, electric machines may be represented using two two-phase models, respectively using the Clarke transform, which is based on a fixed two-phase reference system tied to the stator, and the Park transform, which is based on a rotating two-phase reference system tied to the rotor. The quantities thus transformed in the reference systems tied to the stator and to the rotor are expressed using the indices $\alpha$, $\beta$, on the one hand, and d, q, on the other hand, corresponding respectively to the two axes in the fixed two-phase reference system and to the two axes in the rotating two-phase reference system.

Due to the strong relationship between the magnetic flux of the machine and the torque that is supplied, the torque of the machine is able to be observed through an estimate of the flux of the machine. Several techniques are currently known for estimating the flux of a permanent-magnet three-phase synchronous electric machine based on two-phase currents and voltages. These techniques are classified into two categories, based respectively on a voltage model and on a current model.

Regarding flux estimation techniques based on the voltage model, the electromotive force is calculated using the voltages and the currents measured in the reference system tied to the stator. The stator flux is then obtained by calculating the integral of the electromotive force.

However, this estimation method implies precise knowledge of the initial magnetic conditions (flux of the permanent magnet and of the stator inductances), which is not always the case in reality. Therefore, due to this uncertainty, there may be a resultant offset in the estimate of the amplitude of the flux relative to the real flux of the machine. This offset in the flux estimate using the voltage-flux model then generates an oscillating term on the estimated torque.

Moreover, the problems of demagnetization and magnetic saturation, liable to occur during operation of the machine, also generate an oscillating term on the torque estimated using the voltage-flux model of the machine.

Another source of divergence of the torque thus estimated lies in the non-linearity of the inverter by way of which the machine is supplied with power and/or in measurement uncertainties, which generate an offset on the value of the calculated electromotive force and therefore on the estimated flux value.

Another problem to be solved is that of ensuring observability at low speed or at zero speed.

The problem of observability at low speed arises when certain filters are added in order to solve the above problems (unknown magnetic condition and offset in electromotive force).

The prior art discloses the following documents relating to the estimation of flux based on the voltage model.

Document U.S. Pat. No. 9,985,564B2 describes a method for estimating the stator flux of a permanent-magnet three-phase synchronous electric machine based on the voltage model in the two-phase reference system $\alpha,\beta$. Instead of using a pure integrator to integrate the electromotive force, it proposes to use an electromotive force low-pass filter and then to add a compensator to correct gain and phase changes created by the filter.

Document CN103346726A also proposes to estimate the flux of a permanent-magnet three-phase synchronous electric machine based on electromotive force. It proposes to use a second-order filter instead of a pure integrator. It also proposes to estimate the inductance of the q axis in the two-phase reference system to improve the estimate with the voltage model.

Document U.S. Pat. No. 7,098,623B2 describes a method for estimating the position of the rotor by estimating stator fluxes with the voltage model in the two-phase reference system d,q. It proposes to adaptively observe the flux based on the injection of high-frequency signals at low speed.

Document EP1513250 describes a method for combining the methods for estimating flux based on a voltage model and the injection of high-frequency signals to estimate the position.

Regarding methods based on the current model, the flux is estimated using the currents, preferably in the reference system tied to the rotor. These methods based on the current model make it possible to overcome the abovementioned limitations linked to methods based on the voltage model, since they do not involve the use of open-loop integrators. However, the problems to be solved with regard to these methods relate to variations in the inductances due to magnetic saturation, the uncertainties of the permanent-magnet flux and the need for a position sensor.

The following documents relating to the estimation of flux based on the current model are known from the prior art.

Document U.S. Pat. No. 7,774,148B2 describes a method for estimating the torque of a permanent-magnet three-phase synchronous electric machine based on a flux estimate using the current model. The fluxes of the d and q axes are represented by two non-linear current functions.

Document CN103872951A describes a torque estimator for a permanent-magnet three-phase synchronous electric machine, based on a flux estimate with a sliding-mode observer applied to a voltage model combined with a current model.

Document JP2004166408A describes an adaptive flux estimator for a permanent-magnet three-phase synchronous electric machine, based on the voltage model with a correction term based on the current model.

In this context, the aim of the present invention is to propose a method for estimating the torque of an electric machine, in particular of a permanent-magnet synchronous electric machine for an electric or hybrid motor vehicle, which method is robust with regard to the abovementioned limitations.

To this end, the invention relates to a method for estimating the electromagnetic torque of a permanent-magnet three-phase synchronous electric machine for an electric or hybrid motor vehicle, the method comprising steps of:
- measuring the currents and voltages on the phases of the stator of the machine in a fixed three-phase reference system tied to the stator,
- determining the currents and voltages in a fixed two-phase reference system tied to the stator as a function of the current and voltage measurements in the three-phase reference system,
- calculating a first estimate of the flux of the machine by calculating the integral of the electromotive force, the electromotive force being calculated based on the voltages and currents expressed in the fixed two-phase reference system tied to the stator,
- estimating the electromagnetic torque based on the flux estimated by the first estimate, said method being characterized in that it comprises steps of:
- determining the currents and voltages in a rotating two-phase reference system tied to the rotor as a function of the currents and voltages expressed in the fixed two-phase reference system and the position of the rotor with respect to the stator,
- calculating, in parallel, a second estimate of the flux of the machine using the currents expressed in the rotating two-phase reference system tied to the rotor, said second flux estimate being corrected by introducing variables characterizing magnetic uncertainties of the machine, said variables being determined by an observer based on the stator currents and voltages expressed in the rotating two-phase reference system tied to the rotor,
- comparing the estimated torque and a setpoint torque and
- resetting the initial conditions of the flux in line with the first estimate based on the flux estimated by the second estimate when the difference between the estimated torque and the setpoint torque exceeds a predefined threshold.

Advantageously, the method may comprise a step of deactivating the calculation of said second flux estimate when the difference between the estimated torque and the setpoint torque is less than or equal to said threshold.

Advantageously, the method may comprise a step of determining a percentage of time for which the calculation of said second flux estimate is activated with respect to the operating time of the machine.

Advantageously, the method may comprise a step of compensating for an offset of the calculated electromotive force before it is used in said first flux estimate.

Advantageously, said second estimate of the flux of the machine comprises steps of:
- determining a flux-current model of the machine, taking into account saturation functions of the machine, so as to consider, in the model, variations in magnetic parameters of the machine caused by the magnetic saturation and the demagnetization of the machine,
- introducing, into the model, said variables characterizing the magnetic uncertainties of the machine, inherent to the variations in the magnetic parameters of the machine,
- estimating said variables in the model, performed by said observer,
- calculating said second flux estimate based on said estimated variables.

Advantageously, the magnetic parameters under consideration are the linear inductances of the stator on each axis, respectively, of the rotating two-phase reference system tied to the rotor and the magnetic flux generated by the permanent magnets of the rotor of the machine.

Advantageously, the saturation functions represent magnetic saturation and cross-saturation in the machine.

Advantageously, the method comprises a step of adjusting the observer using a Kalman algorithm.

The invention also relates to a device for estimating the electromagnetic torque of a permanent-magnet three-phase synchronous electric machine for an electric or hybrid motor vehicle, said device being designed to receive currents and voltages measured on the phases of the stator of the machine in a fixed three-phase reference system tied to the stator, transformed into a fixed two-phase reference system tied to the stator, said device comprising:
- a first flux estimator for estimating the flux of the machine in the fixed two-phase reference system tied to the stator, comprising two electromotive force integrators for estimating the respective components of the flux along the two direct and quadrature axes of the fixed two-phase reference system tied to the stator, said electromotive force being calculated based on the currents and voltages applied to each axis of the fixed two-phase reference system tied to the stator,
- a torque estimator, designed to estimate the torque of the machine based on said respective components of the flux estimated in the two axes of the fixed two-phase reference system tied to the stator, said device being characterized in that it comprises:
- a second flux estimator, designed to receive the currents and voltages expressed in the fixed two-phase reference system, transformed into a rotating two-phase reference system tied to the rotor as a function of the position of the rotor with respect to the stator, said second flux estimator being designed to estimate the flux using the currents expressed in the rotating two-phase reference system tied to the rotor, said second estimator comprising an observer based on the stator currents and voltages expressed in the rotating two-phase reference system tied to the rotor, designed to determine variables characterizing magnetic uncertainties of the machine, said variables being used to correct the flux estimate of said second estimator, and
- a detector designed to compare the torque estimated by the torque estimator with a setpoint torque and to generate a signal able to command resetting of the initial conditions of the flux of the two integrators of said first flux estimator, when the difference between the estimated torque and the setpoint torque is greater than a predefined threshold, said initial conditions being reset based on the flux estimate supplied by the second flux estimator.

Advantageously, said signal is able to deactivate the calculation of said second flux estimate by the second flux estimator when the difference between the estimated torque and the setpoint torque is less than or equal to said threshold.

Other features and advantages of the present invention will become more clearly apparent on reading the following description, which is given, by way of illustrative and non-limiting example, with reference to the following single FIGURE:

FIG. 1 is a functional block diagram of a device for implementing the electromagnetic torque estimation method according to the invention.

In the context of the present description, what is therefore of more particular interest is the case of permanent-magnet three-phase synchronous electric machines used in hybrid and electric vehicle applications.

In a first step, the currents and the voltages are measured for each of the three phases of the stator of the permanent-magnet three-phase synchronous machine.

Next, the Park transform is applied to the measured quantities relating to the three phases so as to obtain a direct current component $i_d$ and a quadrature current component $i_q$, along with a direct voltage component $v_d$ and a quadrature voltage component $v_q$.

It is thus possible to transpose the three currents and the three sinusoidal voltages of the stator relating to the three phases of the three-phase system into a space in which the three sinusoidal current and voltage signals are expressed in the form of two constant current and voltage signals, respectively a component on the direct axis and a component on the quadrature axis q. For this purpose, the Park reference system is based on a reference system tied to the rotor.

The torque estimator that will be described in this context is based on the flux estimate of the machine, performed based on an improved voltage-flux model of the machine.

The estimate of the electromagnetic torque of the machine, denoted $\hat{T}_e$, is provided by the following expression (1):

$$\hat{T}_e = \left(\frac{3}{2}\right)(p)(\hat{\lambda}_\alpha i_\beta - \hat{\lambda}_\beta i_\alpha) \tag{1}$$

where:
$i_\alpha$ and $i_\beta$ are the direct and quadrature components, respectively, of the stator current in the Clarke domain, $\alpha$ referring to the direct axis and $\beta$ to the quadrature axis of the Clarke domain, $\lambda_\alpha$ and $\lambda_\beta$ are the direct and quadrature components, respectively, of the total flux seen from the stator in the Clarke domain, p is the number of pole pairs of the machine.

The total flux seen from the stator of a permanent-magnet synchronous electric machine may be estimated by calculating the integral of the electromotive force using the following set of equations (2):

$$\hat{\lambda}_\alpha = \int(v_\alpha - R_s i_\alpha)dt + \hat{\lambda}_\alpha(0) \tag{2}$$

$$\hat{\lambda}_\beta = \int(v_\beta - R_s i_\beta)dt + \hat{\lambda}_\beta(0) \tag{2}$$

where $R_S$ is the resistance of the stator, $v_\alpha$ and $v_\beta$ represent, respectively, the direct and quadrature components of the stator voltage in the Clarke domain, and $\hat{\lambda}_\alpha(0)$ and $\hat{\lambda}_\beta(0)$ represent the initial conditions of the flux according to, respectively, the direct and quadrature components in the Clarke domain.

As will be explained in more detail below, to overcome the problems of estimating the flux using the voltage model of the machine, the invention proposes to improve this model by combining it with a modified current model so as to reset the initial conditions $\hat{\lambda}_\alpha(0)$ and $\hat{\lambda}_\beta(0)$ of the integrators.

More specifically, these initial flux conditions are determined using the current model and an appropriate observer, designed to estimate the magnetic uncertainties of the model, caused by magnetic saturation and demagnetization.

Indeed, the relationship between flux and stator phase current is linear for low current levels. However, for higher currents, this linearity is no longer maintained, thereby generally leading to saturated operation. In addition, high-temperature operation of the machine causes variations in the permanent-magnet flux (demagnetization). The inductances and the magnetic flux of the permanent magnets of the machine thus vary greatly in a predictable manner due to the magnetic saturation and the demagnetization of the machine. It is therefore proposed to adopt a modified flux-current model, which takes these variations into account, so as to improve the behavior of the model.

For this purpose, consideration will be given to unknown magnetic conditions of the machine in the current model. The unknown magnetic conditions under consideration are the linear inductances of the stator, the magnetic flux of the permanent magnets, and the saturation functions of the machine, which represent magnetic saturation and cross-saturation in the machine.

The consideration of these unknown magnetic conditions of the machine in the model results, in the Park space, in the following system of equations:

$$\begin{cases} \dfrac{d\varphi_d}{dt} = v_d - R_s i_d + \omega_e \varphi_q \\ \dfrac{d\varphi_q}{dt} = v_d - R_s i_q - \omega_e \varphi_d - \omega_e \phi_f - \omega_e \Delta\phi_f \end{cases} \tag{3}$$

$$\begin{cases} i_d = \left(\dfrac{1}{L_{d0}} + \Delta L_{d0}^{-1}\right)\varphi_d + f_{1sat}(\varphi_d, \varphi_q) + \Delta f_{1sat} \\ i_q = \left(\dfrac{1}{L_{q0}} + \Delta L_{q0}^{-1}\right)\varphi_q + f_{2sat}(\varphi_d, \varphi_q) + \Delta f_{2sat} \end{cases} \tag{4}$$

where $\varphi_d$ and $\varphi_q$ are the components of the stator flux generated on the direct d and quadrature q axes, respectively, of the Park plane of the machine, $v_d$ and $v_q$ are the voltages applied to the two direct d and quadrature q axes, respectively, of the Park plane of the machine, $i_d$ and $i_q$ are the currents flowing in the machine on the two direct d and quadrature q axes, respectively, of the Park plane of the machine, $R_S$ is the equivalent resistance of the stator of the machine, $L_{d0}$ and $L_{q0}$ are the linear inductances of the stator on each direct d and quadrature q axis, respectively, of the Park plane of the machine, $\phi_f$ is the magnetic flux generated by the permanent magnets of the rotor and $\omega_e$ is the angular velocity of the rotor.

$f_{sat(1,2)}$ are functions that represent magnetic saturation and cross-saturation in the machine.

And:

$$\begin{cases} \Delta\phi_f = \phi_{fm} - \phi_f \\ \Delta L_{d0}^{-1} = \dfrac{1}{L_{d0m}} - \dfrac{1}{L_{d0}} \\ \Delta L_{q0}^{-1} = \dfrac{1}{L_{q0m}} - \dfrac{1}{L_{q0}} \\ \Delta f_{sat(1,2)} = f_{sat(1,2)m} - f_{sat(1,2)} \end{cases} \tag{5}$$

where $L_{d0m}$ and $L_{q0m}$ are the exact values of the linear coefficients between fluxes and stator currents on each direct d and quadrature q axis, respectively, of the Park plane of the machine, $\phi_{fm}$ is the real value of the magnetic flux generated by the permanent magnets of the rotor, and $f_{sat(1,2)m}$ are the respective real saturation functions of the machine. The parameters $\Delta L_{d0}^{-1}$, $\Delta L_{q0}^{-1}$, $\Delta\phi_f$ and $\Delta f_{sat(1,2)}$ thus represent the differences between the real values and the reference values of these parameters in the model proposed by equations (3) and (4).

Two variables $g_1$ and $g_2$ are then introduced into the current model, which correspond to the mentioned unknown magnetic conditions. For this purpose, first considering the stator currents $i_d$ and $i_q$ as state variables, equation (3) is replaced in equation (4), giving:

$$\begin{cases} \dfrac{di_d}{dt} = -\dfrac{R_s}{L_{d0}}i_d + \dfrac{\omega_e L_{q0}}{L_{d0}}i_q - \dfrac{\omega_e L_{q0}}{L_{d0}}g_2 + \dfrac{1}{L_{d0}}v_d + \dfrac{dg_1}{dt} \\ \dfrac{di_q}{dt} = \dfrac{\omega_e L_{d0}}{L_{q0}}i_d - \dfrac{R_s}{L_{q0}}i_q + \dfrac{\omega_e L_{d0}}{L_{q0}}g_1 - \dfrac{\omega_e \phi_f}{L_{q0}} + \dfrac{1}{L_{q0}}v_q + \dfrac{dg_2}{dt} \end{cases} \quad (6)$$

where:

$$\begin{cases} g_1 = \Delta L_{d0}^{-1}\varphi_d + f_{1sat}(\varphi_d, \varphi_q) + \Delta f_{1sat} - \dfrac{\Delta \phi_f}{L_{d0}} \\ g_2 = \Delta L_{q0}^{-1}\varphi_q + f_{2sat}(\varphi_d, \varphi_q) + \Delta f_{2sat} \end{cases} \quad (7)$$

The variables $g_1$ and $g_2$ thus group together all magnetic uncertainties of the machine, as result from the variations in the inductances due to magnetic saturation and the uncertainties of the permanent-magnet flux. In other words, the variables $g_1$ and $g_2$, which will be observed, make it possible to represent the magnetic behavior of the machine, which varies due to magnetic saturation. The introduction, into the current model, of parametric uncertainties, described by the variables $g_1$ and $g_2$, makes it possible to reflect the fact that the value of the magnetic parameters of the system (inductance and permanent-magnet flux) may differ from the model due to saturation and demagnetization of the machine. Observing these variables, as will be described below, will make it possible to correct these uncertainties.

These variables presented in the model will thus be estimated using an appropriate observer. The basis is therefore the flux-current model of the machine described above, which takes into account the variations, caused by magnetic saturation and demagnetization of the machine, in the magnetic parameters of the machine, which are the inductances and the permanent-magnet flux, and on the observer theory, which comprises the notions of observability and state observer. Thus, when the state of a system cannot be measured, an observer is designed and makes it possible to reconstruct this state based on a model of the system and measurements of other states. A state is understood to mean a set of physical values defining the observed system. A Kalman observer will be used here to observe the magnetic uncertainties of the machine as characterized by the variables $g_1$ and $g_2$.

The variables $g_1$ and $g_2$ are therefore considered to be two new state variables. In this model, $g_1$ and $g_2$ are assumed to be piecewise-constant functions, that is to say functions whose values are constant over intervals. The system of equations modeling the electric machine may be reformulated in the general form of non-linear systems:

$$\dfrac{dx}{dt} = f(x, u)$$

$$y = h(x)$$

where:

$$x = \begin{bmatrix} i_d \\ i_q \\ g_1 \\ g_2 \end{bmatrix},$$

$$u = \begin{bmatrix} v_d \\ v_q \end{bmatrix}, \text{ and}$$

$$y = \begin{bmatrix} i_d \\ i_q \end{bmatrix} = h(x) = C \cdot x = \begin{bmatrix} 1 & 0 & 0 & 0 \\ 0 & 1 & 0 & 0 \end{bmatrix} x$$

For the system thus modeled, an observer may be formalized by the following equation:

$$\dfrac{d}{dt}\begin{bmatrix} \hat{i}_d \\ \hat{i}_q \\ \hat{g}_1 \\ \hat{g}_2 \end{bmatrix} = \overbrace{\begin{bmatrix} -\dfrac{R_s}{L_{d0}} & \dfrac{\omega_e L_{q0}}{L_{d0}} & 0 & -\dfrac{\omega_e L_{q0}}{L_{d0}} \\ -\dfrac{\omega_e L_d}{L_{q0}} & -\dfrac{R_s}{L_{q0}} & \dfrac{\omega_e L_{d0}}{L_{q0}} & 0 \\ 0 & 0 & 0 & 0 \\ 0 & 0 & 0 & 0 \end{bmatrix}}^{A}\begin{bmatrix} \hat{i}_d \\ \hat{i}_q \\ \hat{g}_1 \\ \hat{g}_2 \end{bmatrix} + \quad (8)$$

$$\overbrace{\begin{bmatrix} \dfrac{1}{L_d} & 0 \\ 0 & \dfrac{1}{L_q} \\ 0 & 0 \\ 0 & 0 \end{bmatrix}}^{B}\overbrace{\begin{bmatrix} v_d \\ v_q \end{bmatrix}}^{u} + \overbrace{\begin{bmatrix} 0 \\ -\dfrac{\omega_e \phi_{f0}}{L_q} \\ 0 \\ 0 \end{bmatrix}}^{v} + K\left(\begin{bmatrix} i_d \\ i_q \end{bmatrix} - \begin{bmatrix} 1 & 0 & 0 & 0 \\ 0 & 1 & 0 & 0 \end{bmatrix}\begin{bmatrix} \hat{i}_d \\ \hat{i}_q \\ \hat{g}_1 \\ \hat{g}_2 \end{bmatrix}\right)$$

where $\hat{x}$ is the vector of estimated states corresponding to the state vector:

$$x = \begin{bmatrix} i_d \\ i_q \\ g_1 \\ g_2 \end{bmatrix}$$

and K is the gain of the observer.

The choice of the gain K, which multiplies the error term, makes it possible to adjust the observer. This gain is calculated by the Kalman algorithm.

The electric angular velocity of the rotor is considered as an input for the matrix system A. This allows the state to be observed. Use is therefore made of a time-varying observer gain K as:

$$K = P^{-1}C^T R^{-1} \quad (9)$$

where the dynamic range of the variable P is defined as follows:

$$\dfrac{dP}{dt} = -A^T P - PA - PQP + C^T R^{-1} C \quad (10)$$

The matrices Q and R are positive definite symmetric weighting matrices.

Thus, after having estimated the two variables $g_1$ and $g_2$ using the observer, the overall stator fluxes may be estimated on the basis of equations (4) and (7) defined above:

$$\begin{cases} \hat{\lambda}_d = \phi_{f0} + \Delta\phi_f + \hat{\varphi}_d = \phi_f + L_{d0}(i_d - \hat{g}_1) \\ \hat{\lambda}_q = \hat{\varphi}_q = L_{q0}(i_q - \hat{g}_2) \end{cases} \quad (11)$$

It has been seen that the flux-voltage model of the machine has been expressed by set of equations (2) described above, based on which the flux of the machine may be estimated by calculating the integral of the electromotive force. The estimate of the stator flux by the voltage model is therefore based on the use of resettable integrators, insofar as, according to the invention, the initial conditions of the flux for the integrators are determined by an independent observer, as described above, making it possible to estimate the fluxes on the basis of the modified current model, by applying set of equations (11).

Use is thus made of a first estimator based on the voltage model, implementing two pure integrators to estimate the fluxes in the two axes $\alpha$ and $\beta$, corresponding to the two axes in the fixed two-phase reference system, and use is made, in parallel, of another flux estimator based on the current model in the rotating two-phase reference system dq, modified with the observer to estimate the initial flux conditions for the two integrators.

Based on the flux estimate performed using the voltage model thus improved by the use of the other flux estimator based on the current model, the electromagnetic torque generated by the permanent-magnet synchronous electric machine may then be calculated by applying expression (1).

In order to minimize the calculation time in the real-time processing, it is proposed to stop the processing linked to the observer when it is not necessary to initialize the integrators. A detector for defining the time of the initialization is thus proposed. This detector compares the torque estimated by the voltage model, denoted $\hat{T}_e$, with a setpoint torque, denoted $T^*_e$, corresponding to the torque to be supplied by the electric machine of the vehicle, and given by the control system of the vehicle, in particular based on the pressing of the accelerator pedal by the driver. If the absolute value of the error between the setpoint torque and the estimated torque exceeds a predefined threshold $\varepsilon$, the observer will be activated and the two integrators of the flux estimator based on the voltage model will be reset on the basis of the initial flux conditions determined by the flux-current model modified with the observer. A Boolean operator for triggering the resetting of the integrators is thus introduced into the voltage model, defined as below:

$$RES = \begin{cases} 1 & |\hat{T}_e - T^*_e| > \varepsilon \\ 0 & |\hat{T}_e - T^*_e| \le \varepsilon \end{cases}$$

The observer is activated and deactivated when the operator "RES" changes to "1" and to "0", respectively.

It may be of interest to ascertain the percentage of time for which the observer is activated compared to the total operating time of the machine for driving the vehicle. A new monitoring variable is thus introduced, as follows:

$$OT\% = \frac{\sum_i t_i}{t_{tot}}$$

where $\Sigma^{t_i}$ is the sum of the times for which the observer is activated and $t_{tot}$ is the total operating time. The monitored variable OT may vary from 0 to 100% as a function of the unknown initial flux condition at startup, of the quality of the magnet, of the saturation condition of the motor, of the variation in the setpoint torque, etc.

Measurement uncertainties and/or non-linearity of the inverter by way of which the machine is supplied with power may lead to an offset of the calculated electromotive force. Therefore, in order to compensate for this offset so as to avoid a divergence of the estimated flux value over time, provision is made to calculate its average value as follows:

$$e_{\alpha\beta-\text{offset}} = \frac{1}{T}\int_{\xi}^{\xi+T} e_{\alpha\beta} dt$$

where T is the period of the current.

$e_{\alpha\beta\text{-}offset}$ represents the offset in the calculated electromotive force. This value is intended to be subtracted from the electromotive force calculated online before it is used in the integrators of the flux estimator based on the flux-voltage model.

FIG. 1 describes a block diagram of the method for estimating the electromagnetic torque of the machine as has just been described above.

First of all, the measurements of the currents and voltages are collected for each of the three phases of the stator of the permanent-magnet three-phase synchronous machine.

A projection of the measured stator electrical quantities relating to the three phases onto the two fixed axes $(\alpha,\beta)$ of the fixed two-phase, respectively direct and quadrature, reference system is obtained by applying the Clarke transformation. The current and voltage components $i_{\alpha\beta}$ and $V_{\alpha\beta}$ applied to the two direct and quadrature axes, respectively, of the Clarke domain are thus considered at input of the device of FIG. 1 and are supplied to a first flux estimator 10, based on the voltage model.

The first flux estimator 10 firstly determines the direct and quadrature components, respectively, of the electromotive force $e_{\alpha\beta}$ on each of the two axes of the Clarke domain, based on the components $i_{\alpha\beta}$ and $V_{\alpha\beta}$ supplied at input and the stator resistance Rs.

The first flux estimator 10 thus comprises, for each direct and quadrature component, respectively, of the Clarke domain, a multiplier 101 that multiplies the value of the resistance of the stator Rs and the respective component of the current $i_{\alpha\beta}$ for the axis under consideration, and supplies its output to a respective adder 102. For each component under consideration, the corresponding adder 102 then subtracts the output of the multiplier 101 from its input on which the corresponding stator voltage component is received, and supplies, at output, the respective component of the electromotive force $e_{\alpha\beta}$ for the axis under consideration to a respective integrator 103. For each component under consideration, the corresponding integrator 103 calculates the integral of the electromotive force and supplies, at output, the direct and quadrature components $\hat{\lambda}_{\alpha\beta}$, respectively, of the total flux seen from the stator in the Clarke domain.

These direct and quadrature components $\hat{\lambda}_{\alpha\beta}$, respectively, of the total flux seen from the stator in the Clarke domain are supplied to a torque estimator 20, which will calculate the electromagnetic torque supplied by the machine $\hat{T}_e$, by applying expression (1) described above.

As explained above, the torque estimator supplies its output $\hat{T}_e$ to a detector 30, designed to compare the torque $\hat{T}_e$ estimated by the torque estimator 20 on the basis of the voltage model with the setpoint torque $T^*_e$. The detector 30 thus comprises an adder 31, which subtracts this setpoint torque value $T^*_e$ from the output $\hat{T}_e$ supplied by the torque estimator 20 and supplies its output, as an absolute value, to a comparator 32. Said comparator compares the absolute value of the error between the estimated torque and the setpoint torque with the predefined threshold ε and supplies, at output, the Boolean operator RES, intended to command the resetting of the two integrators 103 of the first flux estimator 10 when it changes to the value "1", signifying that the difference, in absolute value, between the estimated torque and the setpoint torque is greater than the predefined threshold.

The implementation of this resetting of the two integrators 103 of the first flux estimator 10 is based, according to the invention, on the activation of a second flux estimator 40, based on the current model in the reference system (d,q), modified with the observer, as explained above, so as to correct the estimated flux taking into account magnetic uncertainties of the model of the machine. The signal RES is therefore used to activate and, preferably, deactivate this second flux estimator 40, when it changes respectively to "1" and "0".

A Park transformation circuit 41 performs the rotation from the reference system (α,β) to the reference system (d,q), as a function of the position of the rotor $θ_e$ with respect to the stator, which is detected by an angular position sensor. The Clarke transformation of the measured stator electrical quantities is thus followed by a rotation of the axes that converts the components $i_{αβ}$ and $V_{αβ}$ of the reference system (α,β) into continuous components along the two direct d and quadrature q axes of the Park plane of the machine.

The current and voltage components $i_{dq}$ and $v_{dq}$ applied to the two direct d and quadrature q axes, respectively, of the Park plane of the machine are thus supplied at input of the second flux estimator 40, which is based on the current model, modified with the observer.

The rotational speed of the rotor $ω_e$ is also supplied at input of this second flux estimator 40.

After having estimated the two variables $g_1$ and $g_2$ using the observer, as explained above, the second flux estimator 40 supplies, at output, the estimated direct d and quadrature q components $\hat{λ}_{dq}$, respectively, of the total flux in the Park plane, by applying set of equations (11) described above.

These components are transformed using the inverse Park transform 42, which performs the rotation from the reference system (d,q) to the reference system (α,β), as a function of the position of the rotor $θ_e$ with respect to the stator. The inverse Park transform 42 therefore supplies, at output, the components $\hat{λ}_{αβ}$ of the total flux in the two-phase reference system α,β, estimated based on the flux-current model of the machine, accompanied with the observer to take into account the magnetic uncertainties of the flux-current model of the machine.

Therefore, when the second flux estimator 40, based on the flux-current model, is activated as a function of the signal RES for resetting the two integrators 103 of the first estimator 10 based on the flux-voltage model, these components are supplied to the two integrators 103 in order to reset the initial conditions $\hat{λ}_α(0)$ and $\hat{λ}_β(0)$ of the integrators.

The device of FIG. 1 also comprises a monitoring circuit 50, intended to measure the activation duration of the second estimator 40 with the observer, through the variable OT described above.

Finally, the device of FIG. 1 also describes a circuit 60 for estimating the offset of the electromotive force, which supplies, at output, the value $e_{αβ\text{-}offset}$ determined in line with the principles set out above. This offset value is supplied to the adder 102 in order to be subtracted from the electromotive force calculated at the output of the adder 102.

The torque of the machine may thus be estimated in a precise and robust manner, even without knowledge of the initial magnetic conditions and taking into account all variations in the magnetic parameters during the operation of the machine.

The invention claimed is:

1. A method for estimating an electromagnetic torque of a permanent-magnet three-phase synchronous electric machine for an electric or hybrid motor vehicle, the method comprising:
   measuring currents and voltages on phases of a stator of the machine in a fixed three-phase reference system tied to the stator;
   determining the currents and voltages in a fixed two-phase reference system tied to the stator as a function of the current and voltage measurements in the three-phase reference system;
   calculating a first estimate of a flux of the machine by calculating an integral of an electromotive force, the electromotive force being calculated based on the voltages and currents expressed in the fixed two-phase reference system tied to the stator;
   estimating the electromagnetic torque based on the flux estimated by the first estimate;
   determining the currents and voltages in a rotating two-phase reference system tied to a rotor as a function of the currents and voltages expressed in the fixed two-phase reference system and a position of the rotor with respect to the stator;
   calculating, in parallel, a second estimate of the flux of the machine using the currents expressed in the rotating two-phase reference system tied to the rotor, said second flux estimate being corrected by introducing variables characterizing magnetic uncertainties of the machine, said variables being determined by an observer based on the stator currents and voltages expressed in the rotating two-phase reference system tied to the rotor;
   comparing the torque estimated based on the flux estimated by the first estimate and a setpoint torque; and
   resetting initial conditions of the flux in line with the first estimate based on the flux estimated by the second estimate when a difference between the torque estimated based on the flux estimated by the first estimate and the setpoint torque exceeds a predefined threshold, wherein
   the method further comprises deactivating the calculation of said second flux estimate when the difference between the torque estimated based on the flux estimated by the first estimate and the setpoint torque is less than or equal to the threshold.

2. The method as claimed in claim 1, further comprising determining a percentage of time for which the calculation of said second flux estimate is activated with respect to an operating time of the machine.

3. The method as claimed in claim 1, wherein said second estimate of the flux of the machine comprises:
- determining a flux-current model of the machine, taking into account saturation functions of the machine, so as to consider, in the model, variations in magnetic parameters of the machine caused by magnetic saturation and demagnetization of the machine,
- introducing, into the model, said variables characterizing the magnetic uncertainties of the machine, inherent to the variations in the magnetic parameters of the machine,
- estimating said variables in the model, performed by said observer, and
- calculating said second flux estimate based on said estimated variables.

4. The method as claimed in claim 3, wherein the magnetic parameters under consideration are linear inductances of the stator on each axis, respectively, of the rotating two-phase reference system tied to the rotor and the magnetic flux generated by the permanent magnets of the rotor of the machine.

5. The method as claimed in claim 3 wherein the saturation functions represent magnetic saturation and cross-saturation in the machine.

6. The method as claimed in claim 1, further comprising adjusting the observer using a Kalman algorithm.

7. A method for estimating an electromagnetic torque of a permanent-magnet three-phase synchronous electric machine for an electric or hybrid motor vehicle, the method comprising:
- measuring currents and voltages on phases of a stator of the machine in a fixed three-phase reference system tied to the stator;
- determining the currents and voltages in a fixed two-phase reference system tied to the stator as a function of the current and voltage measurements in the three-phase reference system;
- calculating a first estimate of a flux of the machine by calculating an integral of an electromotive force, the electromotive force being calculated based on the voltages and currents expressed in the fixed two-phase reference system tied to the stator;
- estimating the electromagnetic torque based on the flux estimated by the first estimate;
- determining the currents and voltages in a rotating two-phase reference system tied to a rotor as a function of the currents and voltages expressed in the fixed two-phase reference system and a position of the rotor with respect to the stator;
- calculating, in parallel, a second estimate of the flux of the machine using the currents expressed in the rotating two-phase reference system tied to the rotor, said second flux estimate being corrected by introducing variables characterizing magnetic uncertainties of the machine, said variables being determined by an observer based on the stator currents and voltages expressed in the rotating two-phase reference system tied to the rotor;
- comparing the torque estimated based on the flux estimated by the first estimate and a setpoint torque; and
- resetting initial conditions of the flux in line with the first estimate based on the flux estimated by the second estimate when a difference between the torque estimated based on the flux estimated by the first estimate and the setpoint torque exceeds a predefined threshold, wherein
- the method further comprises compensating for an offset of the calculated electromotive force before it is used in said first flux estimate.

8. A device for estimating an electromagnetic torque of a permanent-magnet three-phase synchronous electric machine for an electric or hybrid motor vehicle, said device being configured to receive currents and voltages measured on phases of a stator of the machine in a fixed three-phase reference system tied to the stator, transformed into a fixed two-phase reference system tied to the stator, said device comprising:
- a first flux estimator configured to estimate the flux of the machine in the fixed two-phase reference system tied to the stator, comprising two electromotive force integrators for estimating the respective components of the flux along the two direct and quadrature axes of the fixed two-phase reference system tied to the stator, said electromotive force being calculated based on the currents and voltages applied to each axis of the fixed two-phase reference system tied to the stator,
- a torque estimator configured to estimate the torque of the machine based on said respective components of the flux estimated in the two axes of the fixed two-phase reference system tied to the stator,
- a second flux estimator configured to receive the currents and voltages expressed in the fixed two-phase reference system, transformed into a rotating two-phase reference system tied to a rotor as a function of a position of the rotor with respect to the stator, said second flux estimator being configured to estimate the flux using the currents expressed in the rotating two-phase reference system tied to the rotor, said second estimator comprising an observer based on the stator currents and voltages expressed in the rotating two-phase reference system tied to the rotor, configured to determine variables characterizing magnetic uncertainties of the machine, said variables being used to correct the flux estimate of said second estimator, and
- a detector configured to compare the torque estimated by the torque estimator based on said respective components of the flux estimated in the two axes of the fixed two-phase reference system tied to the stator with a setpoint torque and to generate a signal configured to command resetting of initial conditions of the flux of the two integrators of said first flux estimator, when a difference between the estimated torque and the setpoint torque is greater than a predefined threshold, said initial conditions being reset based on the flux estimate supplied by the second flux estimator, wherein
- the signal is configured to deactivate the calculation of said second flux estimate by the second flux estimator when the difference between the estimated torque and the setpoint torque is less than or equal to said threshold.

* * * * *